Sept. 3, 1963 K. E. HATFIELD 3,102,422
PARTICULATE MATERIAL FLOW MEASURING
Filed July 7, 1958
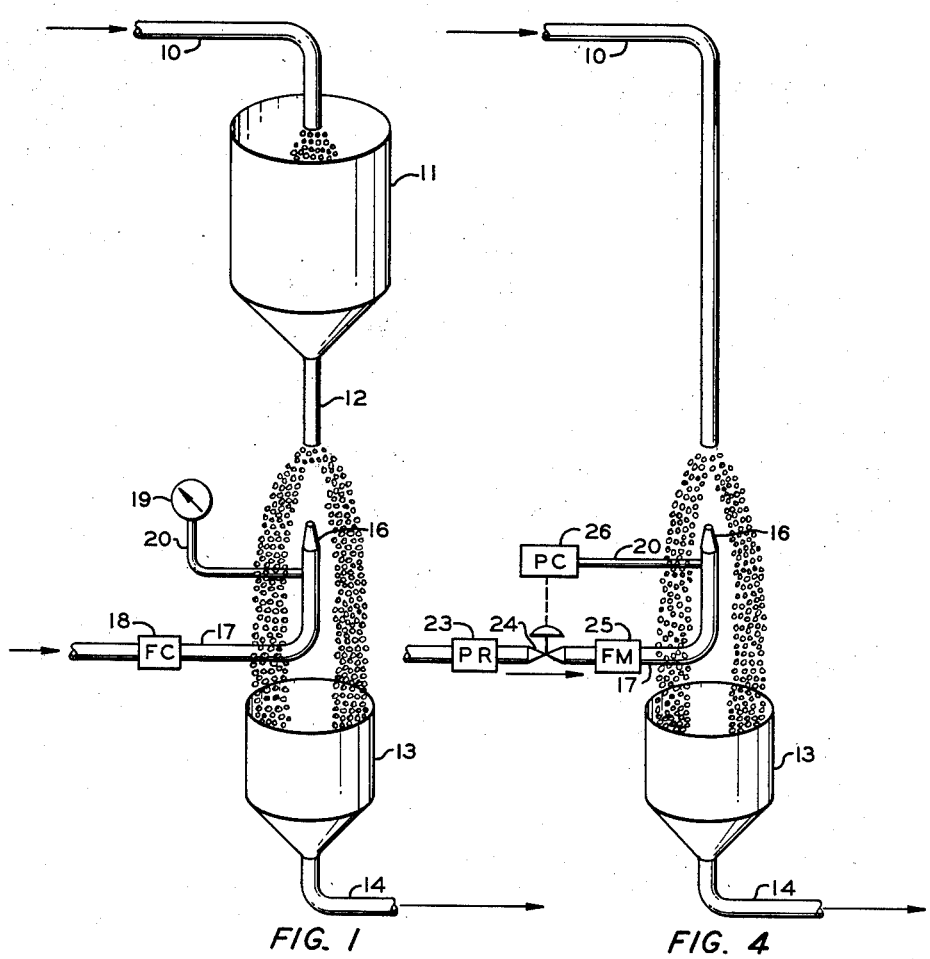
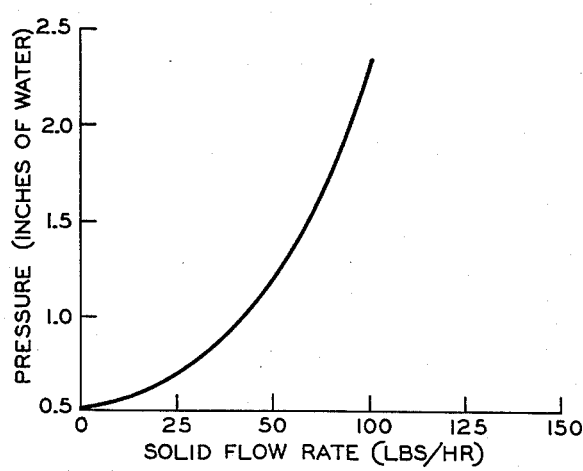
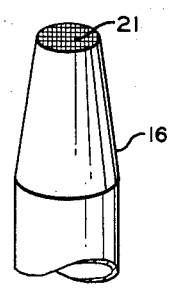
FIG. 2
INVENTOR.
K. E. HATFIELD
BY Hudson & Young
ATTORNEYS

United States Patent Office 3,102,422
Patented Sept. 3, 1963

3,102,422
PARTICULATE MATERIAL FLOW MEASURING
Kent E. Hatfield, Corpus Christi, Tex., assignor to Phillips Petroleum Company, a corporation of Delaware
Filed July 7, 1958, Ser. No. 746,788
1 Claim. (Cl. 73—194)

This invention relates to apparatus for measuring the flow of particulate materials.

In various industrial operations there is a need for a simplified procedure for measuring the flow of particulate materials. Examples of such materials include catalyst particles, sand, gravel, pulverized coal, grain, cement, crushed ores, and the like. Materials of this type are often transported through conduits in an aerated or fluidized state. At the present time it does not appear that any simple apparatus is available for measuring the flow rates of such materials.

In accordance with this invention, there is provided a simple procedure which is capable of measuring the flow of particulate materials with a high degree of accuracy. The material to be measured is directed in a downward path through a conduit and is allowed to fall free from the lower end of the conduit. A second conduit is disposed under the first conduit and has an open end beneath the lower end of the first conduit. A fluid, such as air, is directed through the second conduit so as to travel upwardly toward the first conduit which carries the material to be measured. In this manner, the fluid passed through the second conduit tends to prevent the material from flowing out of the first conduit, whereas the material tends to prevent the fluid from flowing out of the second conduit. The force exerted by the flowing material on the flowing fluid is measured to provide an indication of the flow rate of the material. This force can be measured by measuring the pressure within the second conduit adjacent the open end thereof when the fluid is directed through the second conduit at a predetermined rate. The force can also be measured by measuring the flow of fluid through the second conduit which is required to maintain a predetermined pressure within the second conduit adjacent the open end thereof.

Accordingly, it is an object of this invention to provide novel apparatus for measuring the flow rates of particulate materials.

Other objects, advantages and features of the invention should become apparent from the following detailed description which is taken in conjunction with the accompanying drawing in which:

FIGURE 1 is a schematic representation of a first embodiment of the flow measuring apparatus of this invention.

FIGURE 2 illustrates a modified form of fluid nozzle which can be employed in the apparatus of FIGURE 1.

FIGURE 3 illustrates a typical calibration curve showing the operation of the apparatus of FIGURE 1.

FIGURE 4 is a schematic representation of a second embodiment of the flow measuring apparatus of this invention.

Referring now to the drawing in detail and to FIGURE 1 in particular, there is shown a conduit 10 which is adapted to convey the particulate material to be measured. The material transferred through conduit 10 is discharged into a hopper 11. A nozzle 12 depends from hopper 11, and the material contained within the hopper is permitted to fall through this nozzle. A second hopper 13 is positioned beneath nozzle 12 to receive the material discharged through nozzle 12, which material is removed through an outlet conduit 14.

A second nozzle 16 is positioned beneath nozzle 12 and in axial alignment therewith. A conduit 17, which has a flow controller 18 therein, communicates between nozzle 16 and a source of fluid under pressure, not shown. This fluid, which can advantageously be air, is discharged through nozzle 16 at a predetermined rate which is maintained by flow controller 18. A pressure gauge 19 is connected by a conduit 20 to conduit 17 adjacent nozzle 16. If desired, the end of nozzle 16 can have a screen 21, see FIGURE 2, positioned across the end thereof. This screen is of sufficiently fine mesh to block the particulate material being measured while permitting fluid from conduit 17 to pass therethrough. Screen 21 tends to prevent particles from entering conduit 17.

It has been found that the pressure which is indicated by gauge 19 is an accurate representation of the particle flow rate through discharge nozzle 12 when fluid is discharged through nozzle 16 at a constant rate.

In the normal operation of the apparatus illustrated in FIGURE 1, a suitable calibration curve is first obtained by recording the pressures on gauge 19 for different known rates of flow of material through nozzle 12. A typical calibration curve for the apparatus is illustrated in FIGURE 3. The cylindrical section of hopper 11 was 6 inches in diameter and 4 inches long. The conical section was 2 inches long and tapered from a diameter of 6 inches to a diameter of ½ inch. Nozzle 12 was 3 inches long and had an inside diameter of ½ inch. Nozzle 16 was disposed 2 inches beneath nozzle 12. Nozzle 16 had an inside diameter of ¼ inch at the upper end and ⅜ inch at the lower end, and was ¾ inch long. The flow of air through conduit 17 was maintained constant at a rate of approximately 0.5 standard cubic foot per minute. The material discharged through nozzle 12 was granular aluminum oxide which had a particle density of from 1.3 to 1.6 grams per milliliter and a bulk density of about 0.8 gram per millilter. The particles ranged in size from approximately 100 to 14, based on a Tyler mesh screen. The pressures indicated on the calibration curve of FIGURE 3 are based on a gauge pressure measured in terms of inches of water by an open manometer.

In FIGURE 4 there is shown a second embodiment of the apparatus of this invention. The particles to be measured are directed through a conduit 10 which discharges at a region spaced above nozzle 16. These particles are collected in a hopper 13 and discharged through a conduit 14. Air or other fluid is supplied to nozzle 16 through a conduit 17 which has a pressure regulator 23, a control valve 24 and a flowmeter 25 therein. Conduit 20 transmits the pressure within conduit 17 adjacent nozzle 16 to a pressure controller 26. Pressure controller 26 actuates valve 24 so as to tend to maintain a constant pressure within conduit 17 adjacent nozzle 16. Under this condition, the rate of fluid flow through conduit 17, as indicated by meter 25, is representative of the flow rate of material from conduit 10. Under given pressure conditions, a calibration curve can likewise be prepared wherein flow rates of the particulate material are correlated with measured rates of flow of fluid through conduit 17.

From the foregoing description it should be apparent that there is provided in accordance with this invention a novel method of and apparatus for measuring the flow of particulate materials. This apparatus is simple to construct and can be employed in almost any type of flow system. Instruments 18, 23, 25 and 26 can be conventional control and indicating devices well known to those skilled in the art and which are available commercially. Several types of these instruments are described in "Fundamentals of Instrumentation for the Industries," Minneapolis-Honeywell Regulator Company, Philadelphia, Pa., and in Bulletin 450, the Foxboro Company, Foxboro, Mass. It should be evident that the signals provided by pressure gauge 19 and flowmeter 25 can be employed for control purposes if desired. Suitable apparatus for establishing such control signals is well known to those skilled in the art.

While the invention has been described in conjunction with present preferred embodiments, it should be evident that it is not limited thereto.

What is claimed is:

Apparatus for measuring the flow of particulate material comprising first conduit means extending downwardly through which the material to be measured can be directed, second conduit means positioned beneath said first conduit means in spaced relationship therewith and extending upwardly, means to pass a fluid through said second conduit means at a predetermined rate so that said fluid tends to prevent the particulate material from moving downwardly out of said first conduit means, and means to measure the pressure in said second conduit means adjacent the end thereof which is beneath said first conduit means.

References Cited in the file of this patent

UNITED STATES PATENTS

| | | |
|---|---|---|
| 1,451,064 | Dunajeff | Apr. 10, 1923 |
| 1,822,458 | Rowland et al. | Sept. 8, 1931 |
| 1,947,923 | Schweitzer | Feb. 20, 1934 |
| 2,153,450 | Borden | Apr. 4, 1939 |
| 2,755,057 | Knobel | July 17, 1956 |
| 2,780,938 | Chamberlain | Feb. 12, 1957 |
| 2,915,078 | Ochs | Dec. 1, 1959 |